E. A. PERKINS.
ROLLER BEARING.
APPLICATION FILED AUG. 12, 1918.

1,415,694.

Patented May 9, 1922.
3 SHEETS—SHEET 1.

Edwin A. Perkins
INVENTOR

BY Clarence G. Campbell
ATTORNEY

E. A. PERKINS.
ROLLER BEARING.
APPLICATION FILED AUG. 12, 1918.
1,415,694.
Patented May 9, 1922.
3 SHEETS—SHEET 2.
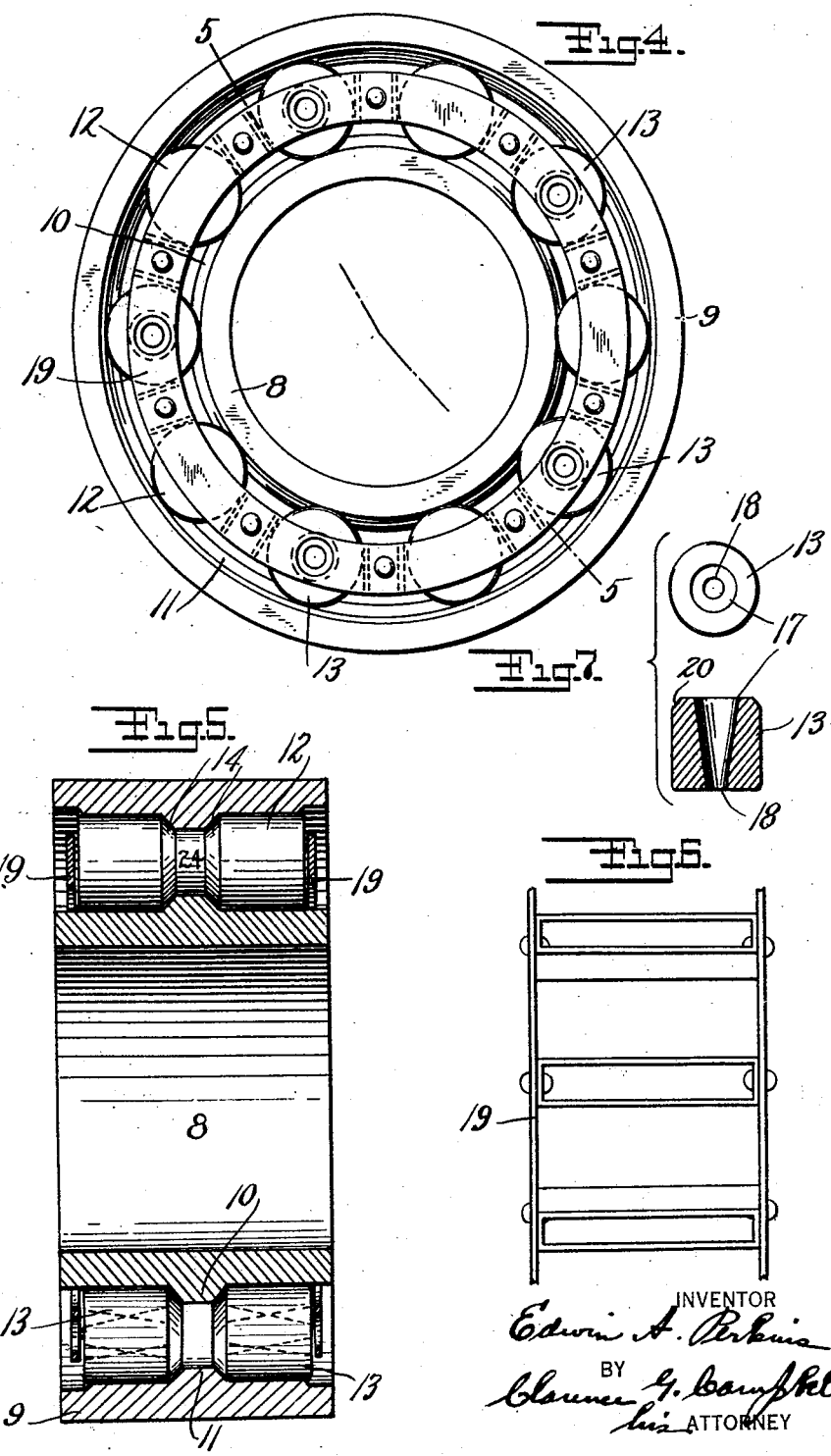

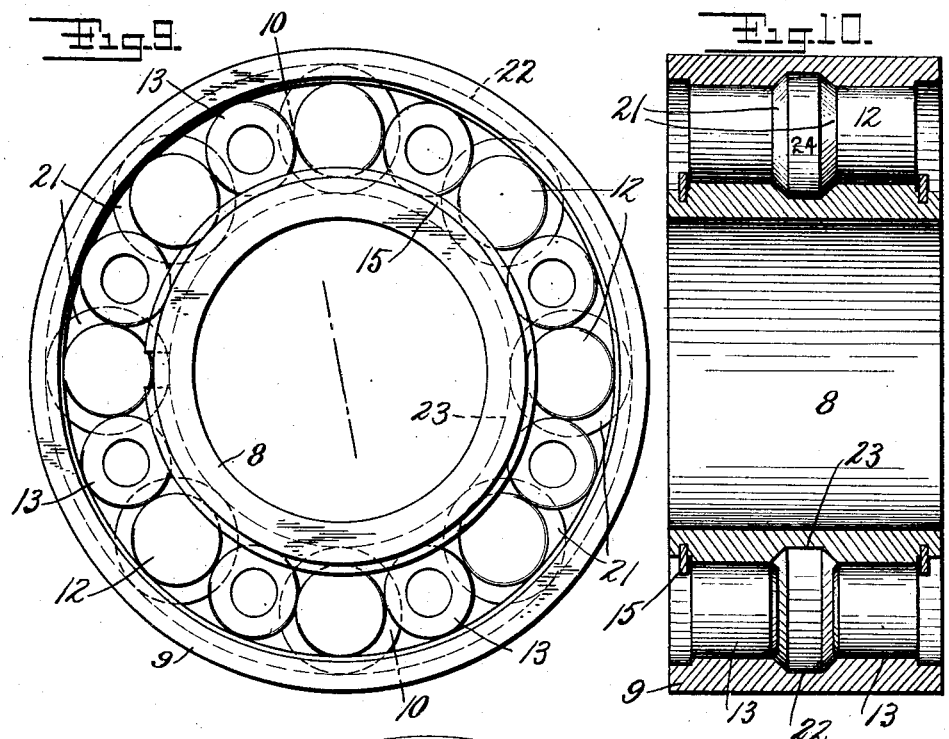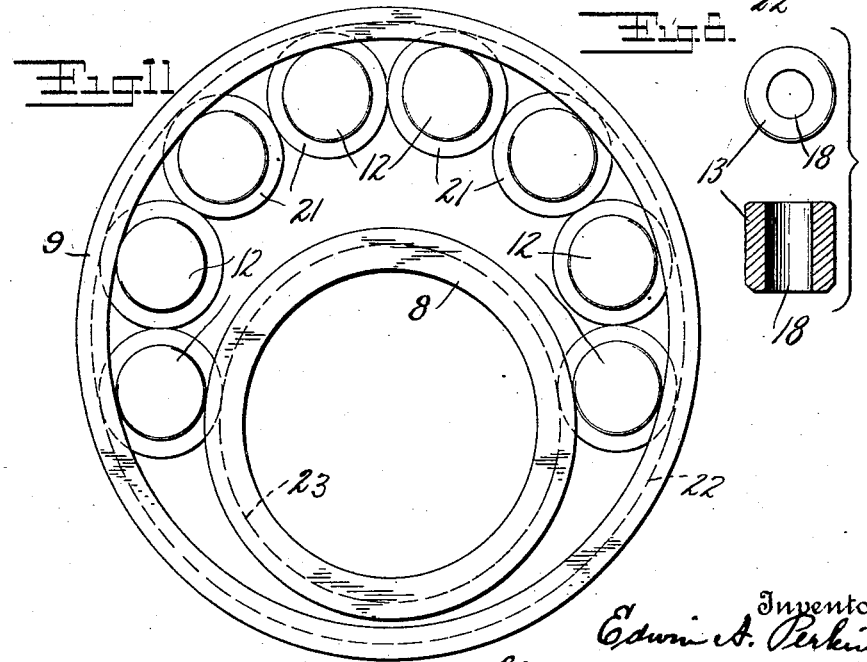

UNITED STATES PATENT OFFICE.

EDWIN A. PERKINS, OF JAMAICA, NEW YORK.

ROLLER BEARING.

1,415,694.  Specification of Letters Patent.  Patented May 9, 1922.

Application filed August 12, 1918. Serial No. 249,402.

*To all whom it may concern:*

Be it known that I, EDWIN A. PERKINS, a citizen of the United States, residing at 74 Middletown Street, Jamaica, Long Island, in the county of Queens and State of New York, have invented certain new and useful Improvements in Roller Bearings, of which the following is a specification.

This invention relates to roller bearings and the process of assembling the same. It has heretofore been necessary generally to use a pair of roller bearings where an end thrust in both directions must be borne, and my invention overcomes this economic waste and clumsy construction by taking care of the end thrust in both directions, so that it is truly a self-contained roller bearing. There has also been very serious difficulty in roller bearings to thoroughly lubricate them at all times, while in use. My invention also overcomes this difficulty by so placing the lubricant that all parts of the interior of the roller bearing will be thoroughly lubricated at all times. There are other features of the construction which are novel, which will appear as the bearing is described.

Figure 1:
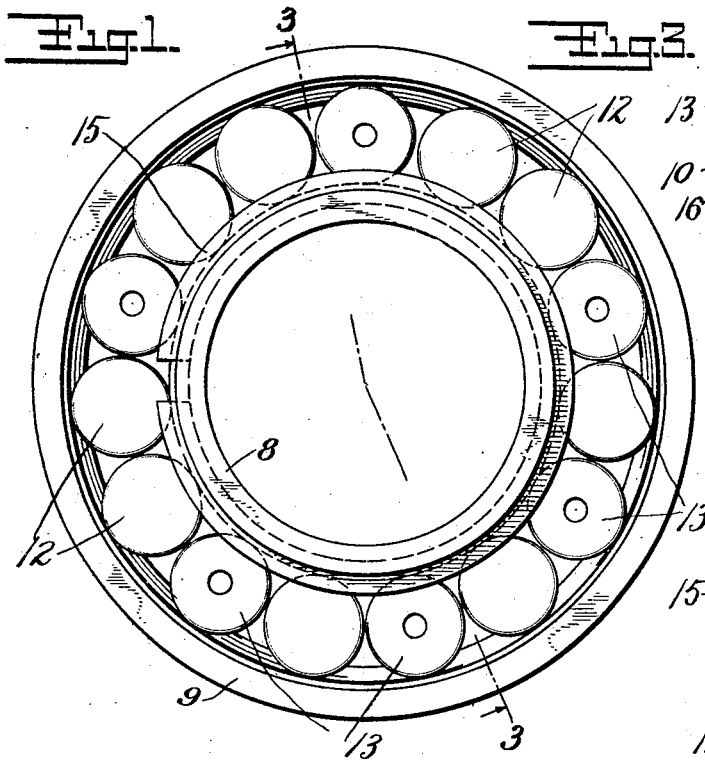
Figure 3:
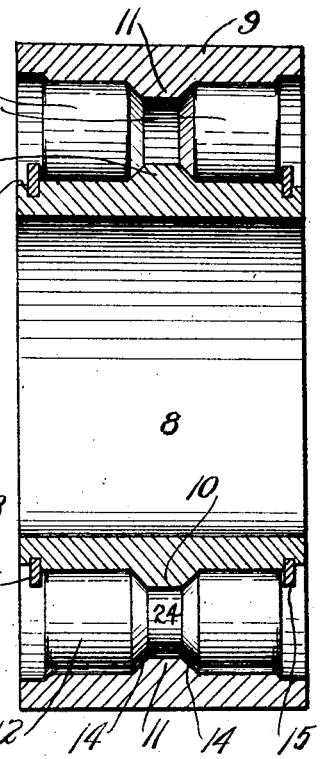
Figure 2:
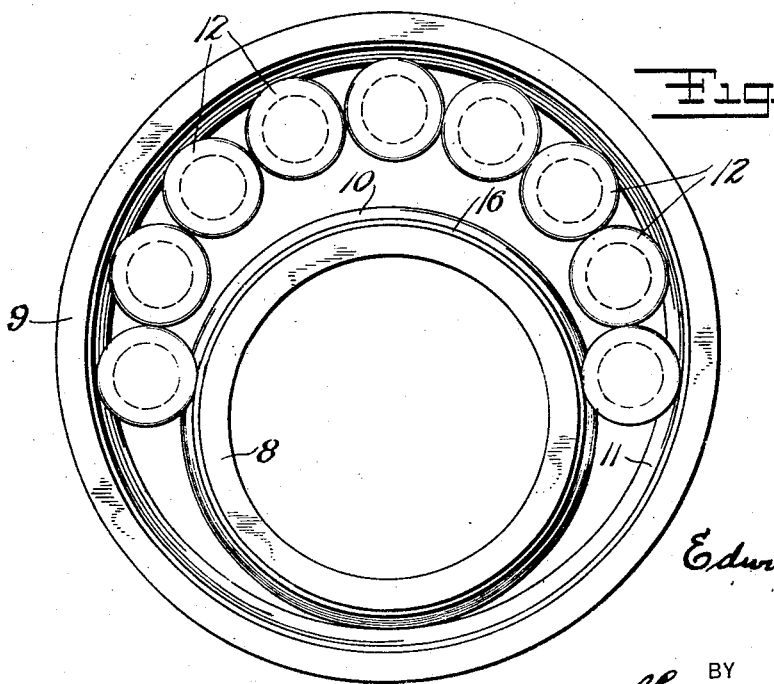

In the drawings, Fig. 1, is a top plan view of one embodiment of my invention. Fig. 2, is a plan view, the same as Fig. 1, with the retaining rings and lubricating rollers removed to show the method of assembling and disassembling. Fig. 3, is a cross sectional view of Fig. 1, on line 3—3. Fig. 4, is a top plan view of a second embodimenet of my invention. Fig. 5, is a cross section of Fig. 4, on line 5—5. Fig. 6, is a perspective of a broken section of a spacing frame, used in the embodiment of the invention shown on Fig. 4. Fig. 7, is an end view and longitudinal sectional view of one of the lubricating rollers of my device. Fig. 8, is a longitudinal sectional view of another form of lubricating roller. Fig. 9, is a top plan view of another embodiment of my invention. Fig. 10, is a cross sectional view of Fig. 9. Fig. 11, is the same as Fig. 9, but showing method of assembling and disassembling.

In the bearing there is an inner ring 8, and an outer ring 9. The inner ring 8 has an outer medial flange 10, and the outer ring 9 has an inner medial flange 11. Interposed between the two rings 8 and 9 and the two flangers 10 and 11 is a set of rollers 12 and also a double row of lubricating rollers 13, suitably arranged between the rollers 12.

The rollers 12 are cut down at their central portion to form bearing surfaces 14 and are adapted to properly bear on the flanges 10 and 11 of the inner and outer rings 8 and 9 being thereby held between the two rings 8 and 9, when the rings are in concentric position. The bearing surfaces 14 are provided to take any end thrust in the direction of the shaft axis, and the bearing surfaces 24 are provided to take the radial thrust.

The rollers 12 are held in their proper circumferential position by placing the lubricating rollers 13 in position, and the lubricating rollers 13 are held in position by means of split rings 15, which are adapted to be sprung into position in grooves 16 near each of the outer ends of the inner ring 8.

To assemble the roller bearing the inner ring 8 is placed in an eccentric position against the inside of the outer ring 9 and the rollers 12 are arranged in position, so that the bearing surfaces 14 engage the medial flange 11. The ring 8 is then pushed into concentric position with the ring 9, so that the rollers 12 can be pushed apart and the lubricating rollers 13 are then slipped into their position between the rollers 12, on one side, and the split ring 15 snapped into position over the same, thereby holding all of the lubricating rollers in position for operation on that side. The roller bearing is then turned over on the other side and the lubricating rollers 13, and the second split ring 15 placed in position in the same manner so that the entire bearing is complete and ready for use.

The lubricating rollers 13 have conical central borings with the larger opening 17 at the inner end and the smaller opening 18 at the outer end, so that any lubricant on the outer end 18 will be pumped by centrifugal action through the openings 17 into the centre of the bearing as it rotates.

Another form of my device is shown in Fig. 4, wherein the usual form of spacing or housing member 19 is shown, which takes the place of the split rings 15 and also reduces the number of rollers 12 and 13 required. The housing member 19 is shown in a broken section in Fig. 6 and is of any usual construction.

Fig. 9, shows another embodiment of any device in which the rollers 12 have flange bearing members 21 adapted to bear on recess bearing faces 22 of the inner ring 8, and on recess bearing faces 23 of the outer ring 9. The method of assembling and disassembling this second embodiment of my invention is shown in Fig. 11.

Fig. 8, shows an alternative form of lubricating roller 13 in which the boring is cylindrical so that the lubricant passing there through would be splashed instead of pumped.

I claim:—

1. In a roller bearing a one piece inner ring having substantially cylindrical external bearing surfaces and an external unbroken flange having bearing surfaces, an outer one piece ring having substantially cylindrical internal bearing surfaces and an internal unbroken flange having bearing surfaces, roller bearings having substantially cylindrical bearing surfaces and recesses having bearing surfaces adapted to bear on either side of said flanges together with means for holding said rollers in proper circumferential position.

2. In a roller bearing an inner ring having substantially cylindrical external bearing surfaces and an external flange having bearing surfaces, an outer ring having substantially cylindrical internal bearing surfaces and an internal flange having bearing surfaces, roller members having substantially cylindrical bearing surfaces and recesses having bearing surfaces adapted to bear on either side of said flanges together with means for holding said rollers in proper circumferential position consisting of roller lubricating members adapted to bear at one end on said flanges and at the other end on a split retaining ring secured in position at each end of the bearing.

3. In a roller bearing an inner ring having an external flange, an outer ring having an internal flange, roller members adapted to roll between and having bearing surfaces which bear on said flanges, roller lubricating spacing members adapted to bear at one end on said flanges and split retaining rings at both ends of the bearing.

4. In a roller bearing an inner ring having an external flange, an outer ring having an internal flange, roller bearing members adapted to roll between and having bearing surfaces which bear on said flanges, lubricating roller spacing members adapted to bear at one end on said flange and split retaining rings at both ends of the bearing adapted to engage slots in the inner or outer ring.

5. In a roller bearing the combination of an inner ring having an outer flange, an outer ring having an inner flange, rollers adapted to roll between said rings and bear at their central portions upon said flanges, lubricating roller spacing members adapted to bear at one end on said flanges and split retaining rings at both ends of the bearing.

6. In a roller bearing the combination of an inner ring, having an outer flange, an outer ring having an inner flange, rollers adapted to roll between said rings and bear at their central portions upon said flanges, lubricating roller spacing members adapted to bear at one end on said flanges and split retaining rings at both ends of the bearing, adapted to engage slots in the inner or outer portion.

7. In a roller bearing an inner ring having an external flange, an outer ring having an internal flange, roller members having radial bearings and bearing surfaces adapted to bear on said flanges, roller lubricating spacing members having substantially conical central apertures, and adapted to bear at one end on said flanges and split retaining rings at both ends of the bearing.

8. In a roller bearing the combination of an inner ring having an outer medial flange, an outer ring having an inner medial flange, rollers adapted to roll between said rings and bear at their central portions upon said flanges, lubricating roller members having central apertures and adapted to bear at one end on said flanges and split retaining rings at both ends of the bearing.

9. In a roller bearing an inner and an outer ring combined with rollers adapted to roll between said rings so as to take up the radial and end thrusts and lubricating roller spacing members inserted between said rollers, together with split retaining rings at both ends of the bearing to engage slots in the inner ring.

In testimony whereof I affix my signature.

EDWIN A. PERKINS.